United States Patent
Battaglia et al.

(10) Patent No.: US 7,457,527 B2
(45) Date of Patent: *Nov. 25, 2008

(54) PORTABLE DATA TRANSFER AND MASS STORAGE DEVICE FOR REMOVABLE MEMORY MODULES

(75) Inventors: Michael S. Battaglia, Naples, FL (US); Offie Lee Drennan, Naples, FL (US)

(73) Assignee: SMDK Corp., Bonita Springs, FL (US)

( * ) Notice: Subject to any disclaimer, the term of this patent is extended or adjusted under 35 U.S.C. 154(b) by 1046 days.

This patent is subject to a terminal disclaimer.

(21) Appl. No.: 10/629,905

(22) Filed: Jul. 30, 2003

(65) Prior Publication Data

US 2004/0057702 A1 Mar. 25, 2004

Related U.S. Application Data

(63) Continuation of application No. 09/149,448, filed on Sep. 9, 1998, now Pat. No. 6,658,202.

(51) Int. Cl.
H04N 5/225 (2006.01)

(52) U.S. Cl. ............... 386/117; 386/124; 386/125; 358/909.1

(58) Field of Classification Search ............ 386/46, 386/117, 124, 125; 348/231.99, 231.1, 231.2, 348/231.3, 231.9, 220.1; 358/906, 909.1
See application file for complete search history.

(56) References Cited

U.S. PATENT DOCUMENTS

| | | | |
|---|---|---|---|
| 4,837,628 A | 6/1989 | Sasaki | |
| 6,005,613 A * | 12/1999 | Endsley et al. | 348/231.6 |
| 6,020,982 A * | 2/2000 | Yamauchi et al. | 358/909.1 |
| 6,256,063 B1 * | 7/2001 | Saito et al. | 348/231.99 |
| 6,658,202 B1 * | 12/2003 | Battaglia et al. | 386/117 |
| 6,987,927 B1 | 1/2006 | Battaglia et al. | |

FOREIGN PATENT DOCUMENTS

| | | |
|---|---|---|
| EP | 786 715 | 7/1997 |
| EP | 1 043 844 | 10/2000 |
| JP | 9-149362 | 6/1997 |
| JP | 09-230496 | 9/1997 |

OTHER PUBLICATIONS

Toshiba, "Toshiba Unveils Mini-Notebook PC", Apr. 17, 1996, 5 pages.

(Continued)

*Primary Examiner*—Robert Chevalier
*Assistant Examiner*—Christopher Onuaku
(74) *Attorney, Agent, or Firm*—Banner & Witcoff, Ltd.

(57) ABSTRACT

A hand-held battery powered device for transferring data between one or more flash memory modules and a mass storage device. The device includes one or more slots to accept a flash memory module into a housing which includes fixed or removable mass storage device and logic circuitry disposed within the housing for transferring data between the flash memory module and mass storage device. Ports are disclosed for transferring data from the resident mass storage device to the user's computer.

37 Claims, 7 Drawing Sheets

OTHER PUBLICATIONS

IBM Palm Top PC 110 Technical Specifications, 2 pages.
IBM Palm Top PC 110, Sep. 25, 1995, Press Release, 3 pages.
IBM Palm Top PC 110, Jun. 18, 1996, 6 pages.
IBM Personaware, Palm Top PC 110, Jun. 18, 1996, 6 pages.
Picture of IBM Palm Top, 1 page.
Invalidity Expert Witness Report of Kristin L. Wood.
Rebuttal expert Report to Invalidity Expert Witness Report of Kristin L. Wood.
"The BYTEBox" http://web.archive.org/web/19980201003900/extrabyte.com/bytebox.htm, Nov. 16, 1997, and http://www.imaging-resource.com/NEWSARCH/arc8-1998.html, 6 pages.
"Strong Prior Art in the Field of 'Digital Photo Wallets'" from MGVision, http://www.imaging-resource.com/NEWSARCH/arc6-1998.html, 4, pages.
"For memory has painted this perfect day whith colors that never fade . . . " Jul. 22, 1998, published in "zonezero.com", http://www.zonezero.com/magazine/dcorner/texto8.html, 8 pages.
Jul. 18, 2007 Communication from the European Patent Office including observations by a third party concerning the patentability of the invention of a foreign counterpart application.
Defendant Audovox's Answer & Counterclaim. SMDK Corp. v. Creative Labs INC, et al. Civil Action No 2:08-cv-26 Mar. 19, 2008.
Defendant Creative Labs, INC's. Answer and Counterclaims to Plaintiff's Complaint. SMDK CORP -v- Creative Labs INC. et al. Civil Action No. 2:08-CV-2A May 27, 2008.
Defendant EPSON America and SEIKO Epson's Answer and Defenses to Plaintiffs Original Complaint for Patent Infringement. SMDK Corp. VS. Creative Labs, Inc. Creative Technology LTD. et al. Civil Action No. 2:08-cv-26 Apr. 30, 2008.
Plaintiff's Original Complaint for Patent Infringement; SMDK CORP v. Creative Labs, INC. et al. Civil Action No. 2:08-cv-26 Mar. 5, 2008.
Docket Listing. SMDK CORP. v. Creative Labs et al. Civil Action No. 2:08-cv-ooo26-TJW, US District Court Eastern District of Texas Date not found Aug. 4, 2008.

* cited by examiner

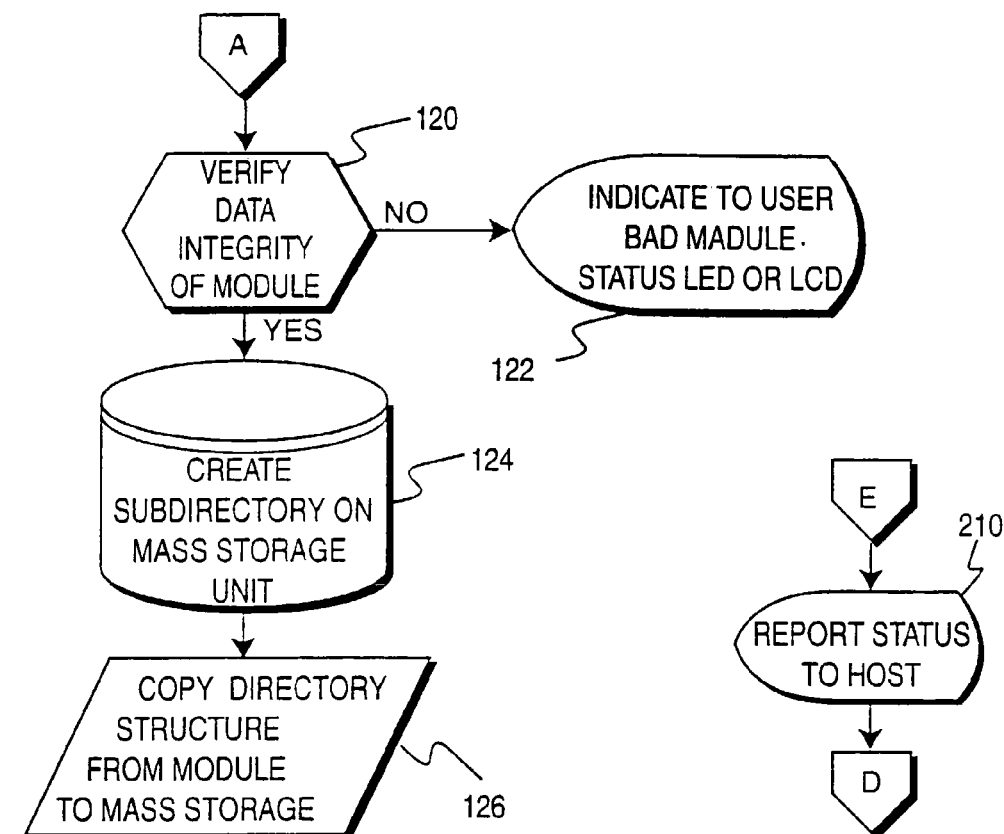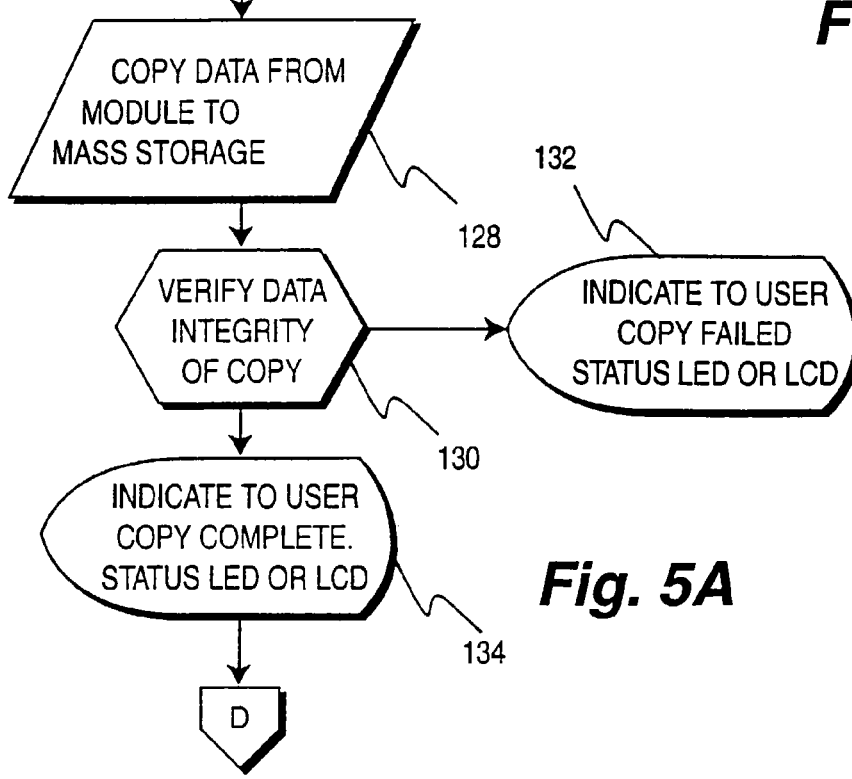
Fig. 5A
Fig. 5D

PORTABLE DATA TRANSFER AND MASS STORAGE DEVICE FOR REMOVABLE MEMORY MODULES

CROSS-REFERENCES TO RELATED APPLICATIONS

This application is a continuation of application Ser. No. 09/149,448, filed Sep. 9, 1998 now U.S. Pat. No. 6,658,202, now pending, the entire content of which is hereby incorporated by reference in this application.

FIELD OF THE INVENTION

This invention relates generally to data transfer and storage devices. More particularly, the invention relates to a hand-held, battery-powered, portable device for transferring data between, for example, a flash memory module used in conjunction with a digital camera or audio device and a mass storage device.

BACKGROUND AND SUMMARY OF THE INVENTION

Over recent years, digital cameras have been rapidly growing in worldwide popularity. Such cameras provide many advantages over the conventional film camera. For example, digital cameras do not require the time and financial expenditures of conventional cameras in terms of film development. Digital cameras are designed to be used in conjunction with a wide range of sophisticated computer graphics processing packages not available for conventional film cameras. Display devices associated with certain digital cameras advantageously provide the photographer with an enhanced ability to frame desired images and to review pictures just taken.

Digital cameras, however, are not without their disadvantages. Conventional high resolution digital cameras are currently very costly and employ expensive memory media which are capable of only capturing a relatively limited number of pictures. Such cameras may utilize a flash memory module having a storage capacity of, for example, 2 to 32 megabytes. These memory modules become increasingly more expensive as the storage capacity increases.

A high resolution digital camera with a conventional flash memory module may only have a storage capacity to permit a photographer to take a very limited number of pictures such as, for example, a half dozen or even fewer pictures. The vacationing photographer may choose to undertake a major expense to be assured of having enough memory modules to record memorable events from a two week vacation.

In accordance with an exemplary embodiment of the present invention, this digital camera shortcoming is overcome by a hand-held, battery-powered portable device for transferring data between a flash memory module and a mass storage device. The mass storage device may be able to store, for example, the contents of the equivalent of hundreds of flash memory modules.

In accordance with one exemplary embodiment of the present invention, the contents of a flash memory module inserted into an insertion memory port in the portable hand-held device is downloaded under operator control to a mass storage device in the form of a fixed or removable hard disk drive. Thereafter, the memory module is reinitialized so that it may be immediately reused in its associated camera.

The above-described features and other advantages of the present invention will become apparent from the following detailed description of the present invention when taken in conjunction with the accompanying drawings.

BRIEF DESCRIPTION OF THE DRAWINGS

FIGS. 5A-5D are flowcharts delineating the sequence of processing for copy, erase, and computer interface command operations.

DETAILED DESCRIPTION OF EXEMPLARY EMBODIMENTS

Figure 1:
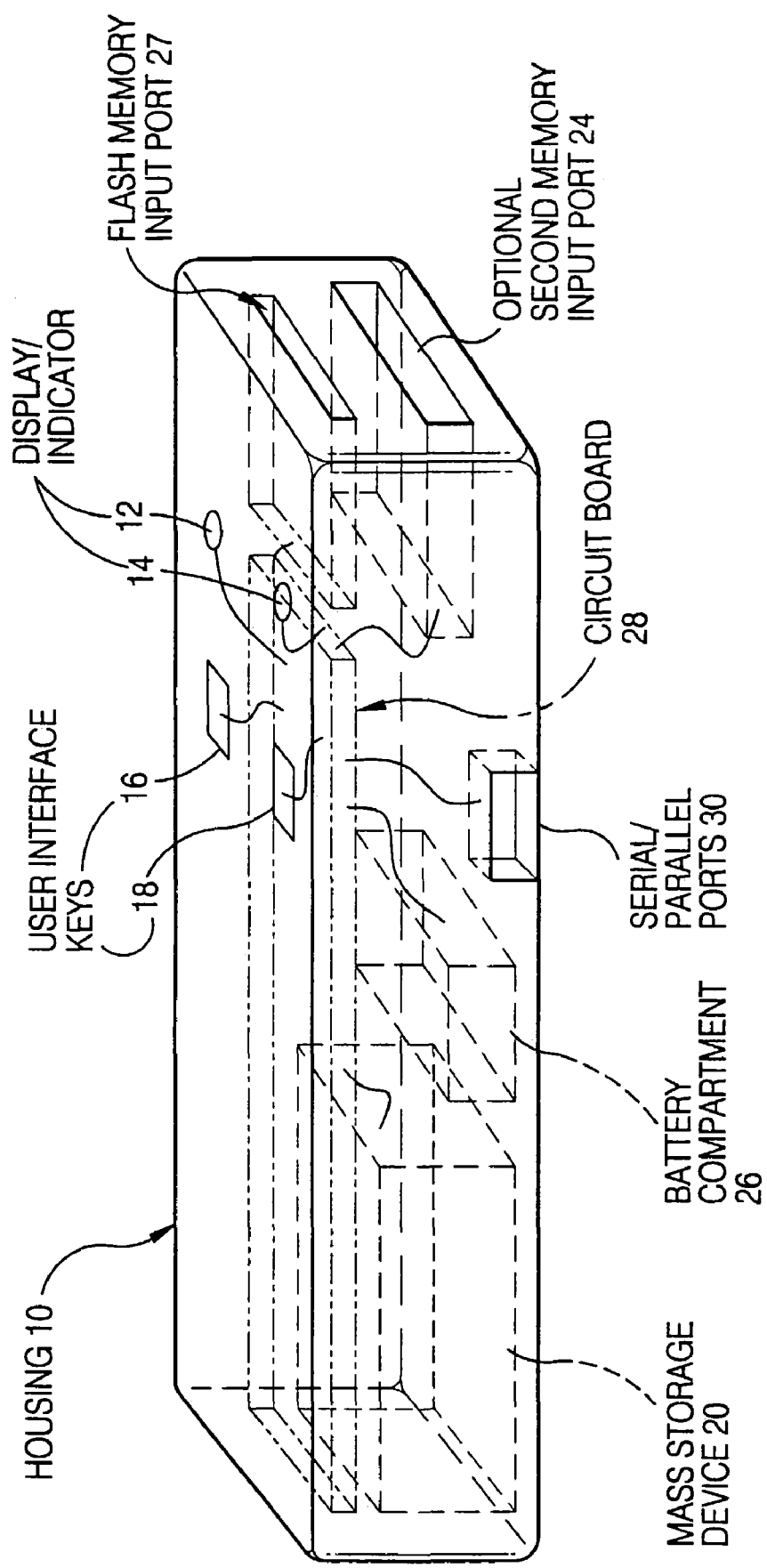
FIG. 1 is a perspective illustration of an exemplary embodiment of the present invention showing a hand-held housing and an exemplary component layout.

FIG. 1 is a schematic, perspective illustration of an exemplary embodiment of the data transfer and storage device in accordance with the present invention. The battery-powered device for transferring data includes a housing 10, which preferably is of a size which can be comfortably held in a user's palm and which is lightweight and readily portable.

As shown in the right hand portion of FIG. 1, the data transfer device includes a flash memory input port 22. In the exemplary embodiment, port 22 is utilized to receive and electrically couple a memory module removed from a digital camera (or other device) to the mass storage device 20 under microprocessor control, as will be explained further in conjunction with FIGS. 2-5. In the presently preferred embodiment, flash memory input port 22 is designed to receive the commercially available Toshiba SmartMedia flash memory module standard. The SmartMedia memory standard is utilized in various digital cameras and may be directly interfaced with a PC's disk drive, for example, via the commercially available FlashPath product. The SmartMedia module includes a flash memory chip, and processing circuitry in the form of a state control machine which controls reading and writing operations to an 8-bit bus. It should be understood that the present invention is not limited to any particular memory media, but may be utilized in conjunction with a variety of memory media where bulk data transfer is desirable. Although the memory module in the presently preferred embodiment contains image data captured from a digital camera, it should be understood that it alternatively may store any type of computer data including audio data used, for example, to reproduce music.

The data transfer and storage device of the presently preferred exemplary embodiment additionally includes an optional second memory input port 24, which is preferably designed to receive a storage media of a different standard than the memory media received in input port 22. By way of example only, the second memory input port 24 is designed to receive the CompactFlash or MMC media sold by SanDisk Corporation and/or the Sony Memory Stick. One or more of the memory media inserted into input ports 22 and 24 may include a microcontroller for performing more sophisticated processing operations as, for example, is done in the CompactFlash product.

Thus, the data transfer and storage device of the presently preferred embodiment is designed to accept more than a single standard flash memory card, and includes multiple slots (e.g., two or more) to support more than one standard. Because input ports 22 and 24 accept memory media of different standards, the media are coupled to mass storage device 20 via different interface and/or control logic circuitry as will be appreciated by those skilled in the art.

User interface keys 16, 18 are utilized by a user to initiate a download of information from the memory media to the mass storage device 20. At least one control key is provided for initiating the download operation. Another user interface key is used to reformat the memory module in accordance with its requirements for reuse in, for example, a digital camera for taking further photographs. The memory module is reformatted to reinitialize the memory module to place it in its initial default state where no data is stored. A "reformat" control key/button may be utilized to, for example, initiate the erasure of data stored on the media. By way of example, the erasure operation may delete all the files on the media, or in more sophisticated embodiments delete certain directories or subdirectories.

In an alternative embodiment of the present invention, the user interface keys 16, 18 comprise a portion of a miniaturized keyboard, which may, for example, be utilized to select particular files and directories to copy to the mass storage device 20, which may (prior to downloading) be displayed on, for example, an LCD display (not shown). Graphical images may be displayed on the LCD display so that the user may preview a particular video image to decide whether it should be saved for long term storage. Such a capability advantageously provides the user with added selectivity and flexibility as to what image data is most desirable to maintain in mass storage device 20.

As opposed to using an LCD display, the user display may include, for example, LED display indicators 12 and 14. Display indicators 12 and 14 may display a wide range of status indications such as, for example, indicating that the flash memory copying operation is complete, and that the power is on. Additional display indicators may show the status of other operations such as, for example, a download operation being in progress.

Figure 2:
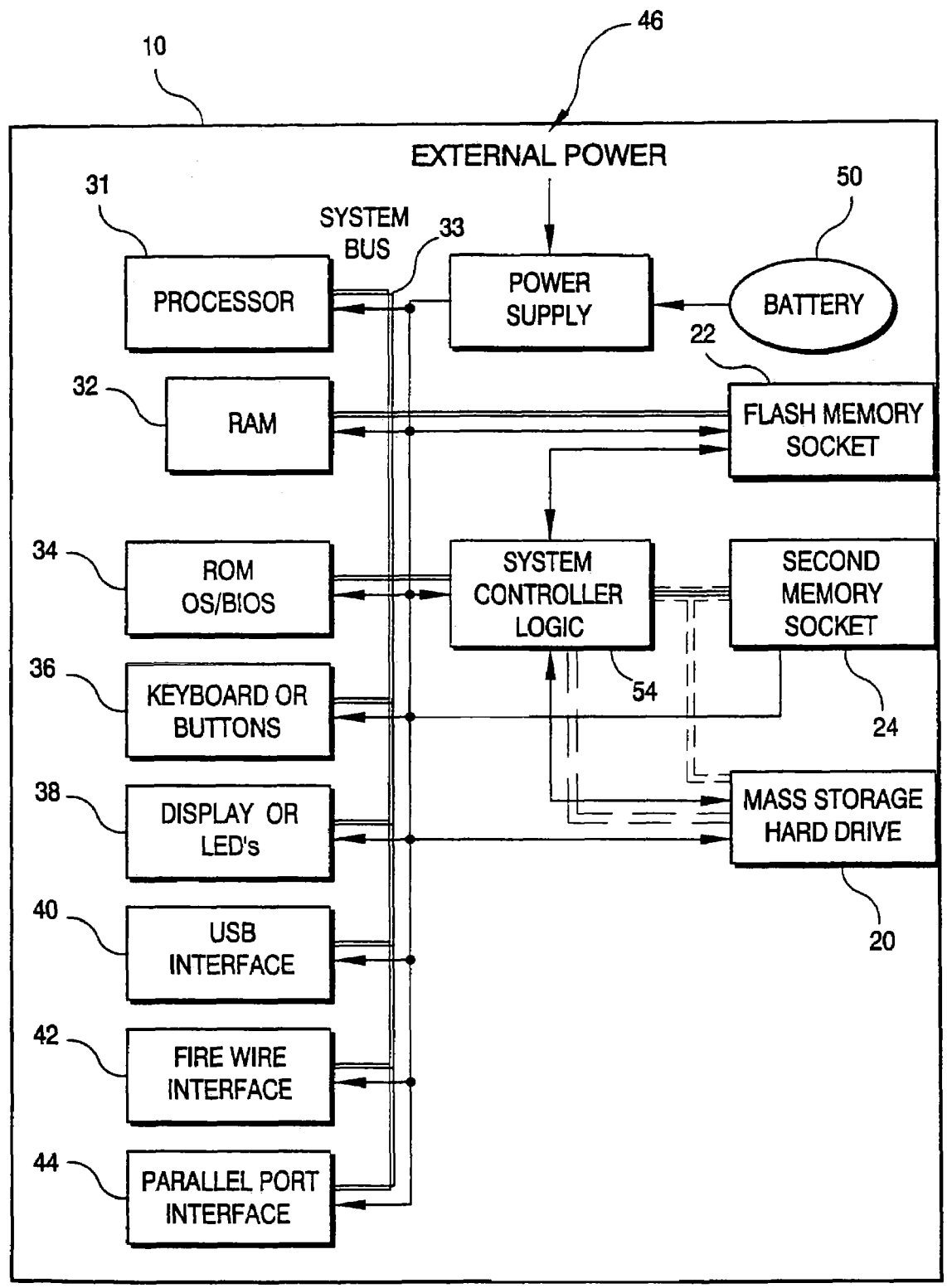
FIG. 2 is an exemplary block diagram of an exemplary implementation of the data transfer and storage system shown in FIG. 1.

FIG. 1 also depicts printed circuit board 28, which supports the electronic components schematically represented in FIG. 1 and which is shown in further detail in FIG. 2. These components are preferably powered by rechargeable batteries stored in battery compartment 26 and/or an AC adapter may be used.

Data is extracted from the FIG. 1 data transfer device through serial/parallel ports 30. Ports 30 are utilized, for example, after flash memory module data has been downloaded from multiple modules to mass storage device 20. The serial/parallel ports 30 permit downloading information from the FIG. 1 portable data repository to the user's personal computer at a convenient future time.

Ports 30 are intended to encompass a wide range of I/O ports including, for example, a Universal Serial Bus (USB), a parallel port, and a high speed serial port, such as a Fire Wire port or any desired subset of these or other known ports. The ports 30 may be designed to receive modules plugged into sockets for operating one of the desired ports.

Mass storage device 20 is preferably a commercially available hard drive. By way of example, such a hard drive may be a 2.5 inch hard drive or other appropriately sized hard drive commercially available from various vendors. The mass storage device 20 preferably includes at least one gigabyte of storage. The mass storage device 20 may, in accordance with one embodiment of the present invention, be fixed internally, or in another embodiment, removable from housing 10. In accordance with yet another embodiment of the present invention, the mass storage device 20 may be a battery backed SRAM. By way of example only, another option for mass storage device 30 is a high capacity flash memory module.

FIG. 2 is a block diagram showing the electronic interconnection between components of an exemplary embodiment of the data transfer and storage device of the present invention. As also depicted in FIG. 1, FIG. 2 includes a flash memory socket 22 and a second memory socket 24 which may be, by way of example only, respectively configured to receive Toshiba's commercially available SmartMedia, SanDisk's Compact Flash or MMC media, or the Sony Memory Stick. The SmartMedia is, in the exemplary embodiment, directly connected to system bus 33. System controller logic 54 includes the logic circuitry for transferring data from, for example, the Smart Media and Compact Flash memory media onto the system bus 33 for transfer to mass storage device 20 as will be explained below in conjunction with the description of FIG. 3.

Figure 3:
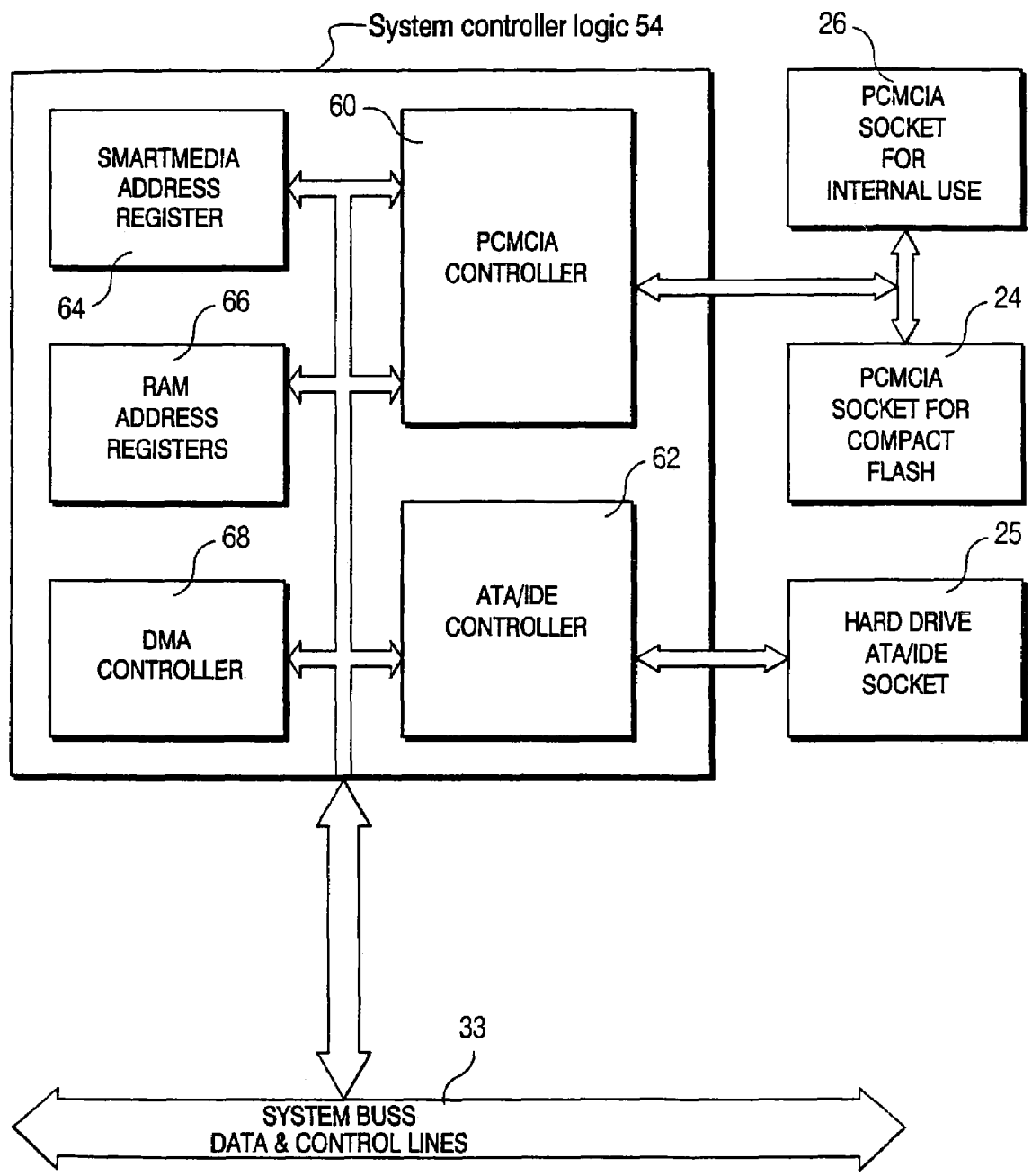
FIG. 3 is a block diagram depicting the system controller logic shown in FIG. 2.

FIG. 3 is an exemplary implementation of the FIG. 2 system controller logic 54 coupled to memory media receiving sockets 24, 25 and 26. In accordance with an exemplary embodiment, sockets 24 and 26 are conventional PCMCIA ports which are electrically and mechanically compatible with the memory media coupled thereto. Thus, the Compact Flash socket 24 is a PCMCIA socket which is mechanically and electrically compatible with a Compact Flash media. If storage device 20 is implemented as a hard drive, a conventional hard drive ATA/IDE socket 25 is used to couple mass storage device 20 to the system controller logic 54. If mass storage device 20 is selected to be a removable hard drive, then a PCMCIA socket 26 may be utilized.

The system controller logic 54 manages the various memory devices to which it is connected under processor 31 control via system bus 33. The system controller logic 54 includes a SmartMedia address register 64 which is coupled to the flash memory/Smart Media socket 22 and which stores the Smart Media starting address to be accessed. Data may then be written to or read from the identified SmartMedia flash memory starting address. Similarly, RAM address registers 66 define desired starting addresses in RAM 32.

DMA controller 68 manages data flow between the various memory devices and may be implemented by a conventional DMA controller having a byte transfer counter and control registers. Through DMA controller 68, data may be moved from, for example, SmartMedia to RAM 32. Under such circumstances, processor 31 loads the appropriate addresses into Smart Media address register 64 and RAM address register 66. The byte transfer counter in DMA controller 68 is then loaded by processor 31 with the number of bytes to be transferred and a DMA controller 68 control register is loaded with information specifying the appropriate operation.

A conventional PCMCIA controller 60 may be utilized to control data exchange operations between the media in PCMCIA sockets 24 and 26 and devices coupled to system bus 33. Controller 60 includes an address decoder (not shown) that is coupled to the system bus 33. Controller 60 also includes configuration registers (not shown) which identify configuration information such as the number of memory media or other devices to which it is connected and the device which is currently communicating with processor 31. Controller 60 also includes a storage device for buffering data, and internal buses for interconnecting controller components. A conventional ATA/IDE controller 62 interfaces hard drive 20 with the system bus 33 and the devices connected thereto. As described above in conjunction with controller 60, ATA/IDE controller 62 includes an address decoder, configuration registers, a memory and internal bus for interfacing with hard drive 20.

Turning back to FIG. 2, data transfers are preferably initiated via a user keyboard, control keys, or buttons 36 under the control of processor 31. In one embodiment of the present invention, a miniature keyboard is utilized by a user to associate notes with an identified image, change the name of files, or to selectively create directories identifying where the user desires to move data.

As set forth in conjunction with the description of FIG. 1, the present invention contemplates a wide range of possible user graphic interfaces. For example, LED's may be utilized to indicate a downloading or other status condition. Alternatively (or additionally, if desired), an LCD display may be utilized for visually depicting, for example, a file name or subdirectory to permit the user to selectively delete undesirable pictures, which also may be displayed for the user to review.

Processor 31 may be any of a wide range of processors but preferably is a RISC-based, for example, 8 bit processor, such as the Atmel 8513. Processor 31, like each of the other components embodied in the data transfer and storage device, is selected to provide optimally low power consumption. Thus, while a variety of different processors may be selected, processor 31 is preferably a high speed processor having extremely low power consumption. The processor's operating system is resident in ROM 34.

The data transfer and storage device shown in FIG. 2 also includes RAM 32. RAM 32 stores operating system (and other processing) variables and buffers data being transferred between, for example, memory modules inserted into ports 22 and 24 and mass storage device 20.

The serial/parallel ports 30 represented in FIG. 1 are shown in FIG. 2 as USB interface 40, Fire Wire interface 42, and parallel port interface 44. These interfaces are utilized for transferring data from mass storage device 20 to, for example, a user's PC or notebook computer. For users having older computers which do not include a USB or Fire Wire interface, parallel port interface 44 may be utilized for downloading data to the user's computer. For newer computers, high speed data transfer may be accomplished via the USB or Fire Wire interfaces 40 or 42, respectively. The output interface ports shown in FIG. 2 are provided by way of example to indicate that a variety of interfaces are contemplated for interfacing with a wide range of user's computers.

The portable device shown in FIG. 2 typically operates under battery power such as, for example, by rechargeable AA batteries 50. Power supply 48, in addition to being powered by batteries 50, may also receive external power to permit a user upon arriving home to save battery power by using household power during uploading information to his or her computer. The external power source also permits batteries 50 to be recharged if rechargeable batteries are being used.

Mass storage 20 is preferably a hard drive as set forth in conjunction with FIG. 1. It is also contemplated that mass storage 20 may be a removable hard drive, a SRAM, or a large storage capacity, high density flash memory or other mass memory media which is commercially available today or becomes commercially available in the future. Mass storage device is coupled to control logic 54 via an ATA/IDE bus or a PCMCIA.

Figure 4:
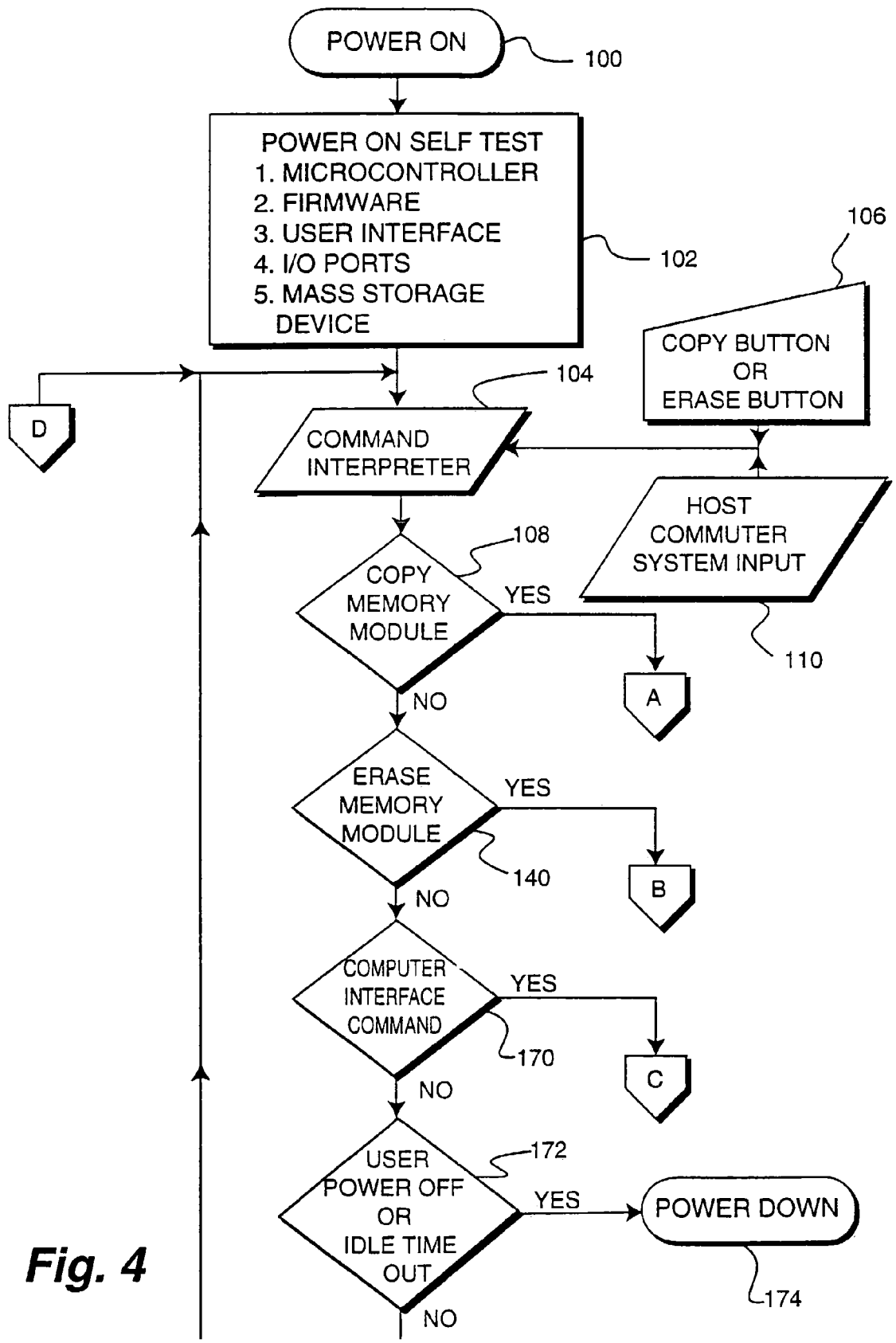
FIG. 4 is a flowchart of exemplary firmware depicting the portable storage device main system operation.
Figure 5B:
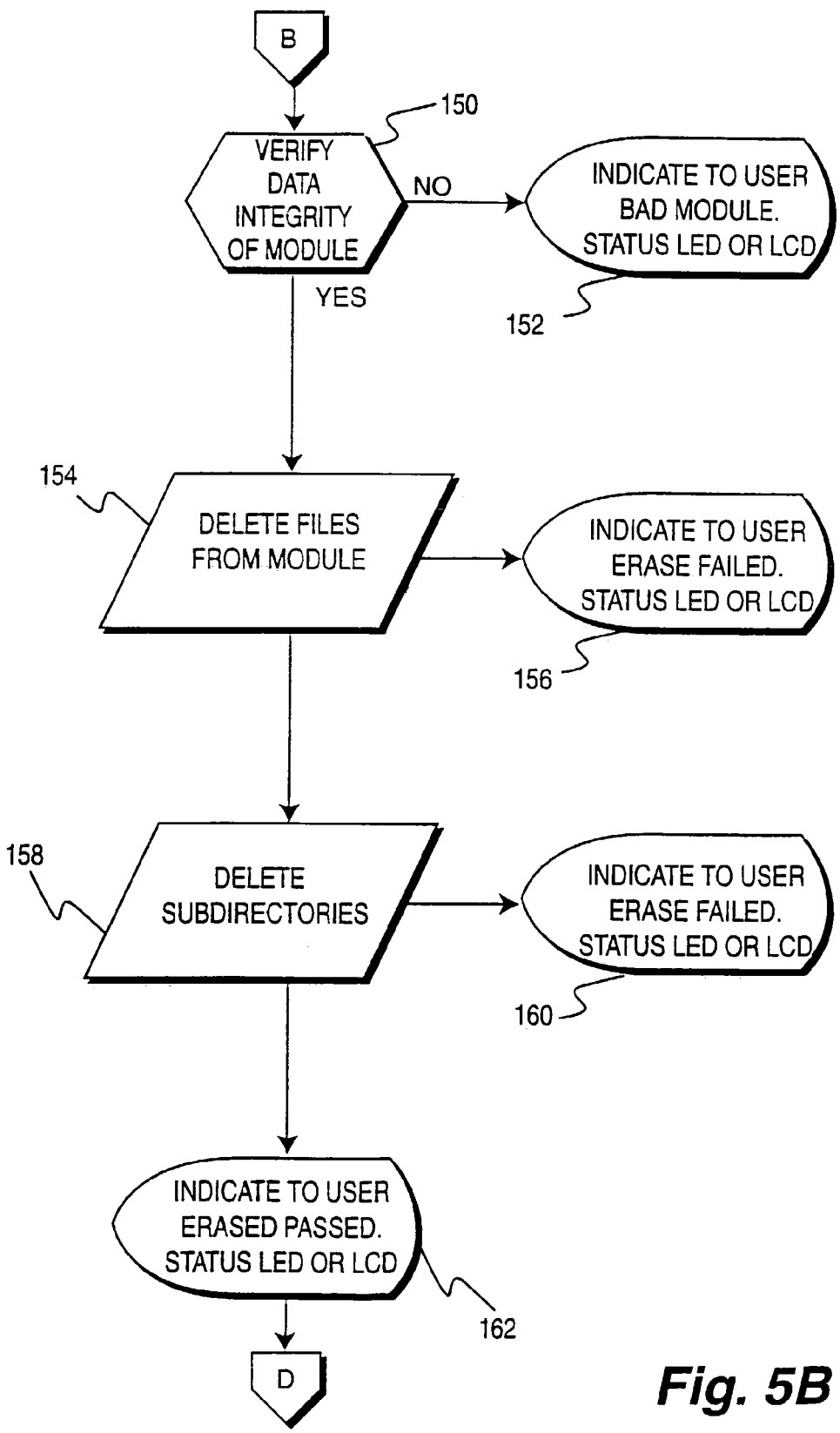
Figure 5C:
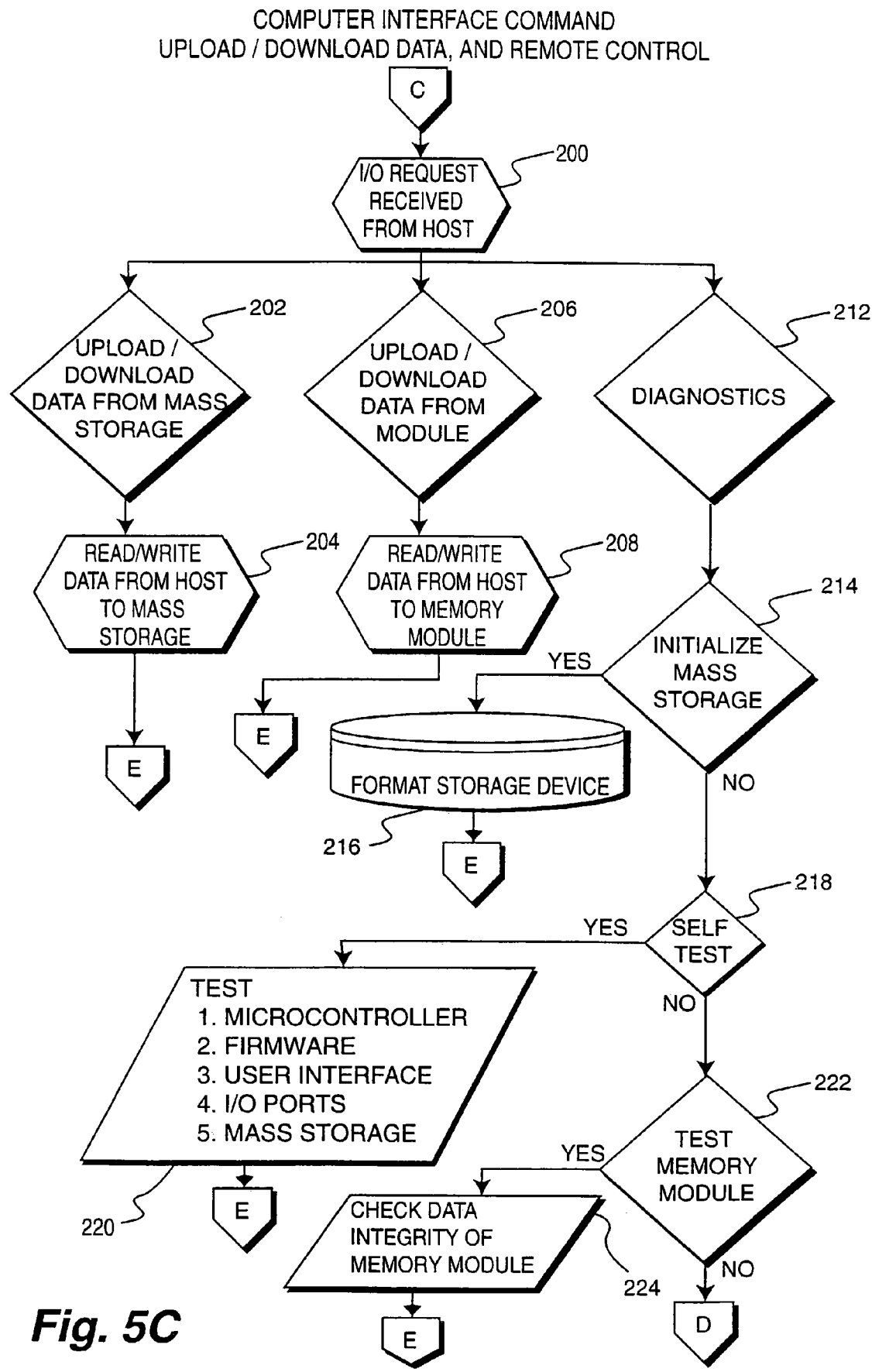

FIG. 4 is a firmware flowchart showing an exemplary set of processing operations that the present preferred embodiment sequences through. After power is turned on (100), processor 31 executes a power-on self test routine whereby the integrity of the device is initially confirmed. The device internal logic is exercised and checked to a limited extent before operating data transfer device. Initially, the integrity of processor 31 and its associated firmware is checked. Next, the user interface functions, the I/O ports, and the mass storage device are checked (102). The power-on self tests include executing diagnostic routines to ensure, for example, that RAM 32 is operational.

Thereafter, a command interpreter loop is entered (104). The system monitors all associated input/output devices for activity to determine the next operation to initiate (104). As represented schematically at block 106, an operation is initiated by a user, for example, actuating a copy or erase button. Alternatively, activity may be detected by processor 31 via the FIG. 2 USB, Fire Wire, or parallel ports 40, 42, and 44 (110). If activity is detected via the host computer system input, then processor 31 must interpret the host command.

At block 108 a check is made to determine whether the detected operational command is a copy memory module command. If so, "copy" operation processing is initiated, whereby data from a memory module is downloaded to mass storage 20 as set forth in the flowchart of FIG. 5A. Initially, the integrity of the data in the memory module is verified to determine that the memory media is a valid module (120). Thus, if the data stored in the memory module does not conform with the appropriate standard format, a "copy" operation will not be performed and an indication will be displayed to the user that the memory module is bad. Such an indication may be displayed, for example, via a status indicating LED or on an LCD display (122).

If the data integrity of the module is good, then subdirectories are created on the mass storage unit (124). Thus, in the process of making such data transfers, processor 31 creates appropriate subdirectories which, for example, may be sequentially numbered for each module that is inserted into, for example, socket 22. Each flash memory module may include its own subdirectory having all the contents of that module resident therein. The contents of the module is then copied into the created subdirectory. After the subdirectory has been created at block 126, the directory structure from the module is copied to the mass storage device (126). Thereafter, the files from the memory module are copied to the mass storage device 20 into the directory structure that had been created (128).

After the data has been copied, the integrity of the data that has been copied is verified to, for example, determine whether data has been loaded onto a defective portion of the hard drive, or whether there has been a power failure or a component failure (130). If the data cannot be verified, then an indication that the copying operation failed is conveyed to the user via a status LED or via an LCD display (132). If desired, an indication of the nature of the error may be displayed on an LCD display. If the integrity of the data is verified, then the user receives an indication that the copying operation has been successfully completed via a status LED or LCD (134) and the routine branches back to the command interpreter block 104 to await further activity.

If a copy memory module operation was not initiated then, as shown in FIG. 4, a check is made to determine whether an "erase memory" command has been initiated (140). If so, the routine branches to the flowchart shown in FIG. 5B, which delineates erase operation processing. Erase operation processing is utilized, for example, to prepare a flash memory module for reuse so that further pictures can be taken with the user's digital camera. Initially, a check is made to verify the data integrity of the memory module (150). This check ensures that the module has, for example, the proper data fields or supported density or supported voltage before any operation is performed thereon. If the memory module is determined to be bad, then the user receives a "bad memory media" indication, either via a status LED or via an LCD display (152).

If the module has been verified as being a valid module, then the desired files are deleted from the module (154). If the files cannot be deleted, then information is conveyed to the user that the erase operation has failed via a status LED or an LCD display (156). After the files have been deleted, memory media subdirectories are deleted (158). If the subdirectories cannot be deleted, then an indication is conveyed to the user that the erase operation failed via status LED or a LCD display (160). After subdirectories have been deleted, an indication is conveyed to the user that the erasure operation was successful via a status LED or LCD display (162) and the routine branches back to the FIG. 4 command interpreter.

If an "erase memory module" operation has not been initiated, then a check is made at block 170 to determine whether a computer interface command was initiated. If so, the routine branches to the FIG. 5C flowchart depicting computer interface command processing.

Computer interface processing typically occurs after the user, for example, has completed a photography session and has interconnected the portable data storage and transfer device to his or her PC. During such operations a user may download pictures stored in the mass storage device to the PC or alternatively, upload, for example, pictures stored in the PC to the portable storage device's mass media.

Initially, a check is made at block 200 to determine whether an I/O request has been received from a user's host PC and, if so, what kind of request has been initiated. As indicated at block 202, a check is made as to whether the requested activity is to upload or download data from or to mass storage device 20 to, for example, upload or download pictures (202). By uploading pictures from a user's PC, the portable data transfer and storage device thereafter may be utilized to hand-carry highly desirable pictures from one user's PC to another user's PC. Depending upon the desired direction of data transfer, data is either read from or written to the host or the mass storage device 20 (204). As indicated in FIG. 5D, a status report is then sent to the host and the routine branches back to FIG. 4 and its command interpreter block 104. During the data transfer process from or to the mass storage, the user would have the ability to delete files, rename files, and a wide range of other conventional file processing operations. Such host/mass storage data exchanges operate under the control of software resident in the user's PC.

As indicated at block 206, a check is also made to determine whether data exchanges are to take place between the memory module and the host computer (206). In this fashion, reading to or writing from the host to the memory module is controlled (208). Similar to exchanges between the host PC and mass storage, a wide range of data transfer operations may be controlled. After the host to memory module data exchange, a status report is sent to the host (210) and the routine branches back to the FIG. 4 command interpreter 104.

If the processing of block 200 reveals that an I/O request was received from the host, a check is also made to determine if the request was a diagnostics command (212). Such diagnostics may appropriately be initiated either during the device manufacturing phase or for user diagnostics. Initially, a check is made as to whether to initialize mass storage 20 (214). If the check at 214 indicates that mass storage is to be initialized to, for example, recover from a failure, the storage device 20 is reformatted (216), a status report is transmitted to the host (FIG. 5D at 210), and the routine branches back to the FIG. 4 command interpreter (104).

If the check at block 214 indicates that the mass storage 20 is not to be initialized, then a check is made to determine whether self test processing is be initiated (218). If self tests are to be initiated, then self test processing begins (220). The self tests performed at block 220 are more comprehensive than the power-on self tests previously referenced in that they output diagnostic information useful to service personnel for correcting a problem relating to processor 31 and its associated firmware, the user interface devices, the I/O ports and the mass storage device. Upon completion of these tests, the host processor is sent a status report (210) and the routine branches to the FIG. 4 command interpreter block 104.

If no self test command was received, a check is made to determine whether the memory media should be tested (222). If so, the integrity of data from the memory module is checked to respond for example, to a user complaint that the memory media can not be read. Service personnel can then determine that, for example, a particular data field has been corrupted requiring reformatting of the module. If no memory module testing has been initiated, the routine branches back to the command interpreter at block 104.

If no computer interface command has been initiated as determined at block 170, a check is made at 172 (FIG. 4) to determine if the user has depressed a power off key or alternatively has let the data transfer device sit idle for more than a predetermined idle time. If so, the device powers down (174). If not, the routine branches back to command interpreter block 104 to continue checking for command related activity.

The present invention may be utilized in a wide range of applications in addition to being used by amateur photographers. For example, the present invention may be used in conjunction with a team of professional photographers covering an event for a newspaper or magazine. Individual photographers having digital cameras may, for example, meet at a central location and transfer flash memory modules to a colleague having the present data transfer and storage device for storage of all the data. Such accumulated data may thereafter be downloaded to the newspaper's or magazine's central office computer.

It will be understood by those skilled in the art that the foregoing description is in the terms of a preferred embodiment of the present invention, wherein various changes and modifications may be made without departing from the spirit and scope of the invention as set forth in the appended claims.

What is claimed is:

1. For use in transferring image data between a removable digital memory module and a user's computer, a portable, hand-held, digital camera picture image data transfer and repository device embodied in a housing connectable to both a removable memory module and a user's notebook or desktop computer and which is of a size which can be held in a user's palm, said repository device comprising:

a housing of a size to be held in the palm of a user's hand and including a memory input port sized to receive a digital camera memory module having at least one digital data structure;

a mass storage device operatively coupled to receive and store picture image data from a digital camera memory module inserted into said memory input port and for storing said image data, said mass storage device having at least one gigabyte of storage and being accessible for downloading said image data to a user's computer;

a user operable control button for initiating a copy operation for copying image data stored in said memory module to said mass storage device;

processing circuitry for controlling the transfer of data stored in said digital camera memory module inserted into said memory input port to said mass storage device, said processing circuitry being operable responsive to a user's actuation of said control button to initiate a copy operation and to verify that the copy operation has been correctly performed; said processing circuitry being operable in response to a user input to change a name associated with said digital data structure;

a display device for displaying picture image data; and an output interface, coupled to said mass storage device, for use in transferring image data stored in said mass storage device to said user's computer, said output interface being compatible with an interface of said user's computer.

2. A portable, hand-held, digital camera picture image data transfer and repository device in accordance with claim 1, wherein said
processing circuitry is operable to reformat a digital camera memory module inserted into said memory input port to place said digital camera memory module into a state where it can be reused in the user's digital camera for picture capture.

3. A portable, hand-held, digital camera picture image data transfer and repository device in accordance with claim 1, wherein said output interface includes a USB interface operatively coupled to said mass storage for transferring picture image data to a user's computer and wherein said processing circuitry is operable to power down upon detecting more than a predetermined idle time.

4. A portable, hand-held, digital camera picture image data transfer and repository device in accordance with claim 1, wherein said processing circuitry in determining that the copy operation has been correctly performed is operable to determine whether the data stored in the memory module conforms with a standard format.

5. A portable, hand-held, digital camera picture image data transfer and repository device in accordance with claim 1, wherein said mass storage device is a removable hard.

6. A portable, hand-held, digital camera picture image data transfer and repository device in accordance with claim 1, wherein said mass storage device is a hard drive and wherein said data repository device is operable to receive digital image data from a user's computer.

7. A portable, hand-held, digital camera picture image data transfer and repository device in accordance with claim 1, wherein said processing circuitry is a RISC-based processor operable to edit image-related data.

8. A portable, hand-held, digital camera picture image data transfer and repository device in accordance with claim 7, wherein said processing circuitry is operable to delete files on said removable memory module.

9. A portable, hand-held, digital camera picture image data transfer and repository device in accordance with claim 7, wherein graphical images may be displayed on said display to preview a video image prior to transfer to said mass storage device.

10. A portable, hand-held, digital camera picture image data transfer and repository device in accordance with claim 1, wherein said mass storage device is removable.

11. For use in transferring data between a removable flash memory module and a user's computer, a portable, hand-held, general purpose, digital data transfer and repository device embodied in a housing connectable to both a removable memory module and a user's notebook or desktop computer and which is of a size which can be held in a user's palm, said repository device comprising:

a housing of a size to be held in the palm of a user's hand and including a flash memory insertion section for receiving a digital memory module having at least one digital data structure, a mass storage device contained within said hand-held housing and operatively coupled to receive and store digital data from said digital memory module, said mass storage device having at least one gigabyte of storage and being accessible for data transfer between said portable repository device and a user's computer;

at least one user operable button for permitting a user to change a name associated with said at least one digital data structure;

a RISC-based processor contained within said hand-held housing for controlling the transfer of data stored in said digital memory module to said mass storage device, said RISC-based processor being operable in response to a user's actuation of said at least one user operable button to change a name associated with said digital data structure, a display device for displaying data relating to the contents of said digital memory module; said RISC-based processor being operable in a preview mode for controlling the display of data on said display device to thereby enable a user to preview the data; and an output interface, coupled to said mass storage device, for use in transferring data between said mass storage device and said user's computer, said output interface being compatible with an interface of said user's computer.

12. A portable, hand-held, digital data transfer and repository device in accordance with claim 11, wherein said at least one user operable button permits a user to associate text information with an image.

13. A portable, hand-held, digital data transfer and repository device in accordance with claim 11, wherein said digital data structure is a file and the user is able to change the name of a file.

14. A portable, hand-held, digital data transfer and repository device in accordance with claim 11, wherein said at least one user operable button permits a user to enter data for creating a directory.

15. A portable, hand-held, digital data transfer and repository device in accordance with claim 11, wherein said at least one user operable button permits a user to enter data indicative of where data is to be moved.

16. A portable, hand-held, digital data transfer and repository device in accordance with claim 11, further including a display device for displaying video image data; wherein said data repository device is operable to receive digital image data from a users's computer.

17. A portable, hand-held, digital data transfer and repository device in accordance with claim 11, wherein said digital memory module stores audio data.

18. A portable, hand-held, digital data transfer and repository device in accordance with claim 11, wherein said RISC-based processor is operable to reformat a memory module inserted into said flash memory insertion section to place the memory module into a state where it can be reused, said processor being operable to power down upon detecting more than a predetermined idle time.

19. For use in transferring image data between a removable digital memory module and a user's computer, a portable, hand-held, digital camera picture image data transfer and repository device embodied in a housing connectable to both a removable memory module and a user's notebook or desktop computer and which is of a size which can be held in a user's palm, said repository device comprising:

- a housing of a size to be held in the palm of a user's hand and including at least one flash memory input port sized to receive a digital camera memory module storing at least one digital data structure;
- a mass storage device operatively coupled to receive and store picture image data from a digital camera memory module inserted into said memory input port and for storing said image data, said mass storage device having at least one gigabyte of storage and being accessible for downloading said image data to a user's computer;
- an LCD display for displaying digital camera image data;
- a user operable control button for initiating a copy operation for copying image data stored in said memory module to said mass storage device;
- a RISC-based processor for controlling the transfer of data stored in said digital camera module inserted into said memory input port to said mass storage device, said RISC-based processor being responsive to a user's actuation of said control button to initiate a copy operation and to verify that the copy operation has been correctly performed; said RISC based processor being operable in an image preview mode for controlling the display of digital camera image data to thereby enable a user to preview the digital camera image data, said RISC-based processor being operable in response to a user input to change a name associated with said digital data structure;
- at least one LED display, said processor being operable to energize said at least one LED to provide at least one status indication; and
- an output interface, coupled to said mass storage device, for use in transferring image data stored in said mass storage device to said user's computer, said output interface being compatible with an interface of said user's computer.

20. A portable, hand-held, digital camera picture image data transfer and repository device in accordance with claim 19, wherein said
RISC-based processor is operable to access information from diverse kinds of digital camera memory modules.

21. A portable, hand-held, digital camera picture image data transfer and repository device in accordance with claim 19, wherein said output interface includes a USB interface operatively coupled to said mass storage device for transferring picture image data to a user's computer.

22. A portable, hand-held, digital camera picture image data transfer and repository device in accordance with claim 19, wherein said memory input port is Compact Flash compatible, and further including an additional memory input port sized to receive a further flash media distinct from a Compact Flash media.

23. A portable, hand-held, digital camera picture image data transfer and repository device in accordance with claim 19, wherein said data repository device is operable to receive digital image data from a user's computer.

24. A portable, hand-held, digital camera picture image data transfer and repository device in accordance with claim 22, wherein said RISC-based processor circuitry is operable to edit data, said processor being operable to power down upon detecting more than a predetermined idle time.

25. A portable, hand-held, digital camera picture image data transfer and repository device in accordance with claim 24, wherein said processing circuitry is operable to delete files on said memory module.

26. A portable, hand-held, digital camera picture image data transfer and repository device in accordance with claim 24, wherein graphical images may be displayed on said display to preview a video image prior to transfer to said mass storage device.

27. A portable, hand-held, digital camera picture image data transfer and repository device in accordance with claim 19, wherein said mass storage device is removable.

28. For use in transferring image data between a removable digital memory module and a user's computer, a portable, hand-held, digital camera picture image data transfer and repository device embodied in a housing connectable to both a removable memory module and a user's notebook or desktop computer and which is of a size which can be held in a user's palm, said repository device comprising:

- a housing of a size to be held in the palm of a user's hand and including a plurality of flash memory input ports including a first flash memory input port compatible with a first type of flash memory digital camera storage device for storing at least one digital data structure, and a second flash memory input port compatible with a second type of flash memory digital camera storage device for storing at least one digital data structure;
- a mass storage device operatively coupled to receive and store picture image data from a digital camera memory module inserted into said memory input port and for storing said image data, said mass storage device having at least one gigabyte of storage and being accessible for downloading said image data to a user's computer;
- an LCD display for displaying digital camera image data;
- a user operable control button to enable a user to select a copy operation for copying image data stored in said memory module to said mass storage device;
- a RISC-based processor being operable to access information from diverse kinds of digital camera memory modules and for controlling the transfer of data stored in a digital camera module inserted into said memory input port to said mass storage device, said RISC-based processor being responsive to a user's selection of a copy operation to initiate a copy operation and to verify that the copy operation has been correctly performed; said RISC-based processor being operable in an image preview mode for controlling the display of digital camera image data to thereby enable a user to preview the digital camera image data, said RISC-based processor being operable in response to a user input to change a name associated with at least one digital data structure associated with a flash memory digital camera storage device;
- at least one LED display, said processor being operable to energize said at least one LED to provide at least one status indication; and
- a USB interface operatively coupled to said mass storage device for transferring picture image data to a user's computer.

29. A portable, hand-held, digital camera picture image data transfer and repository device in accordance with claim 28, wherein said first memory input port is Compact Flash compatible.

30. A portable, hand-held, digital camera picture image data transfer and repository device in accordance with claim 29, wherein said processing circuitry is operable to delete files on said removable memory module.

31. A portable, hand-held, digital camera picture image data transfer and repository device in accordance with claim 30, wherein said mass storage device is removable.

32. A portable, hand-held, digital camera picture image data transfer and repository device in accordance with claim 30, wherein said RISC-based processor is operable to power down upon detecting more than a predetermined idle time.

33. A method of operating a portable, hand-held, digital camera picture image data transfer and repository device embodied in a housing connectable to both a removable memory module and a user's notebook or desktop computer and which is of a size which can be held in a user's palm, said repository device including a housing of a size to be held in the palm of a user's hand and including at least one flash memory input port sized to receive a digital camera memory module storing at least one digital data structure; a mass storage device having at least one gigabyte of storage and operatively coupled to receive and store picture image data from a digital camera memory module inserted into said memory input port, a RISC-based processor, at least one user-operated button, and an LCD display for displaying digital camera image data, said method comprising:

displaying on said LCD display, under the control of said RISC-based-processor, digital camera image data to enable a user to preview the digital camera image data;

initiating under the control of said RISC-based processor in response to a user's selection of a copy operation the transfer of data stored in a digital camera module inserted into said memory input port to said mass storage device;

verifying that the copy operation has been correctly performed;

changing a name of a digital data structure in response to a user operation; and displaying at least one status indication identifying an operation being performed by said repository device.

34. A method according to claim 33, further including the step of deleting a file associated with a digital camera memory module.

35. A method according to claim 33, further including the step of initiating a powering down operation upon said RISC-based processor detecting more than a predetermined idle time.

36. A method according to claim 33, further including the step of transferring picture image data to a user's computer.

37. A method according to claim 33, wherein said memory input port is Compact Flash compatible, and further including the step of receiving data from an additional memory input port sized to receive a further flash media distinct from a Compact Flash media.

* * * * *

UNITED STATES PATENT AND TRADEMARK OFFICE
CERTIFICATE OF CORRECTION

PATENT NO. : 7,457,527 B2  Page 1 of 1
APPLICATION NO. : 10/629905
DATED : November 25, 2008
INVENTOR(S) : Michael S. Battaglia et al.

It is certified that error appears in the above-identified patent and that said Letters Patent is hereby corrected as shown below:

On the Title Page, References Cited Item (56), Other Publications:
    Please insert: --SmartDisk "User Guide for FlashTrax", SmartDisk Corporation, pages 1-23, 2003 XP-002259871.--

Signed and Sealed this

Fourth Day of August, 2009

JOHN DOLL
*Acting Director of the United States Patent and Trademark Office*